(12) United States Patent
Bi et al.

(10) Patent No.: US 10,106,898 B2
(45) Date of Patent: Oct. 23, 2018

(54) METHOD AND APPARATUS FOR CORROSION INHIBITION

(71) Applicant: Mitsubishi Electric Corporation, Tokyo (JP)

(72) Inventors: Huichao Bi, Cambridge (GB); Gordon Timothy Burstein, Cambridge (GB); Georgeanna Kawaley, Scotland (GB)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 27 days.

(21) Appl. No.: 15/085,349

(22) Filed: Mar. 30, 2016

(65) Prior Publication Data
US 2016/0289846 A1 Oct. 6, 2016

(30) Foreign Application Priority Data
Mar. 31, 2015 (EP) .................... 15162035

(51) Int. Cl.
*C23F 13/20* (2006.01)
*C23F 13/02* (2006.01)
*C23F 13/22* (2006.01)

(52) U.S. Cl.
CPC .............. *C23F 13/20* (2013.01); *C23F 13/02* (2013.01); *C23F 13/22* (2013.01); *C23F 2213/32* (2013.01)

(58) Field of Classification Search
CPC ........... C23F 13/20; C23F 13/22; C23F 13/02
See application file for complete search history.

(56) References Cited

U.S. PATENT DOCUMENTS

| | | | | |
|---|---|---|---|---|
| 3,616,417 A | * | 10/1971 | Wilson | G01N 17/02 204/404 |
| 3,717,566 A | * | 2/1973 | Wilson | G01N 17/02 204/404 |
| 3,973,056 A | | 8/1976 | Fessler et al. | |
| 4,110,181 A | | 8/1978 | Sluse et al. | |
| 2007/0243709 A1 | * | 10/2007 | Duboust | B23H 5/08 438/692 |
| 2007/0261969 A1 | | 11/2007 | Greco et al. | |

(Continued)

FOREIGN PATENT DOCUMENTS

| | | |
|---|---|---|
| EP | 2 775 297 A1 | 9/2014 |
| WO | WO 91/09153 A1 | 6/1991 |
| WO | WO 2015/019634 A1 | 2/2015 |

OTHER PUBLICATIONS

Extended European Search Report issued in European Patent Application No. 15162035.8 dated Jul. 24, 2015.

(Continued)

*Primary Examiner* — Regina M Yoo
(74) *Attorney, Agent, or Firm* — Birch, Stewart, Kolasch & Birch, LLP

(57) ABSTRACT

The invention relates to a method for improved corrosion inhibition of metal in a system, in which system the metal is in contact with water, and a corrosion inhibitor inhibits a corrosion of the metal, wherein a voltage is applied between the metal and an auxiliary electrode, which voltage changes time-dependently after being switched on and before being switched off within a passivation region of the metal in said corrosion inhibitor, the passivation region being a region of voltage in which the corrosion inhibitor effects an inhibition of corrosion of the metal.

19 Claims, 13 Drawing Sheets

(56) References Cited

U.S. PATENT DOCUMENTS

2008/0261049 A1* 10/2008 Hayashi .................. H01B 1/22
428/418
2011/0143154 A1   6/2011 Wagh et al.

OTHER PUBLICATIONS

Lin et al., "Corrosion inhibition of steel by thiourea and cations under incomplete cathodic protection in a 3.5% NaCl solution and seawater", Journal of Applied Electrochemistry, vol. 29, No. 8, 1999, pp. 511-918.

* cited by examiner

Electrochemical Circuit

A  B  C  D

METHOD AND APPARATUS FOR CORROSION INHIBITION

BACKGROUND OF THE INVENTION

The invention relates to a method and an apparatus for improved corrosion inhibition of metal in a system, in which system the metal is in contact with water and a corrosion inhibitor solution inhibits the corrosion of the metal.

Domestic water distribution systems are usually made from metal as for example copper. Corrosion of such metal used for potable water is a major and ongoing problem in many countries. Localized, or pitting corrosion is recognized as one of the major problems with metal tubing failure in water. It occurs in certain areas where the attack penetrates the pipe wall, causing water leakage through pinhole.

Corrosion inhibitors are widely used to minimize corrosion in tap water and to prevent plumbing pinhole generation and water leakage. When added in small concentrations, inhibitors can effectively inhibit the corrosion reaction of the metal with the environment. Both inorganic inhibitors, such as phosphate inhibitors and organic compounds such as azoles, amines and amino acids have been used as corrosion inhibitors for metals. Benzotriazole (BTA) is one of the most extensively used and effective inhibitors against corrosion of for example copper as metal.

It is the problem to be solved by the present invention to improve the corrosion inhibition of a corrosion inhibitor in a system in which metal is in contact with water.

SUMMARY OF THE INVENTION

The problem is solved by the method for improved corrosion inhibition of metal according to claim 1 and the apparatus for inhibiting corrosion of metal according to claim 21. The respective dependent claims describe advantageous embodiments of the method according to claim 1 and the apparatus according to claim 21.

According to the invention, a method for improved corrosion inhibition of metal is provided. The method is employed in a system in which metal is in contact with water and a corrosion inhibitor inhibits a corrosion of the metal. Such a system can for example be domestic water pipelines or systems for domestic and/or industrial heating.

Corrosion inhibition in this context, is understood as any reduction or decrease of corrosion and can in particular include full prevention of corrosion.

That in the system a corrosion inhibitor inhibits a corrosion of the metal includes a case where the corrosion inhibitor solution inhibits the corrosion of the metal at a time at which it is in contact with the metal or at which it is present in the system, and it can also comprise the case where the corrosion inhibitor solution has been in contact with the metal or has been present in the system but is no longer in contact with the metal or present in the system. Here, the case that the corrosion inhibitor solution is no longer in contact with the metal or no longer present in the system shall optionally include the case where the corrosion inhibitor solution has been removed from the system while some corrosion inhibitor may remain in contact with the metal the corrosion of which is to be inhibited.

The latter case that the corrosion inhibitor inhibits a corrosion of the metal while the corrosion inhibitor solution is no longer present in the system is based on the insight that in a system in which corrosion inhibitor solution had been present but is no longer present, corrosion is still efficiently inhibited. While the reason for this effect is still not fully understood, the present invention shall advantageously cover the case that this effect is due to remains of inhibitor in contact with the metal after removing the inhibitor solution, as well as the case where this effect has a reason which does not require inhibitor remains in contact with the metal.

In this document, persistence of the inhibitor is defined as the ability of the inhibitor to protect the metal surface when the source of the inhibitor, that is the inhibitor solution, is removed. This ability can be due to the ability of the inhibitor to resist detachment from the metal surface it protects.

It is a basic finding of the present invention that the inhibition of corrosion by a corrosion inhibitor solution can be improved if a voltage is applied between the metal and an auxiliary electrode, which voltage changes time-dependently after being switched on and before being switched off within a passivation region of the metal in said corrosion inhibitor. Surprisingly, this improvement has also been found if the voltage is applied at a time after the corrosion inhibitor solution had been in contact with the metal but is no longer in contact with the metal.

As already indicated above, the voltage changes time-dependently after being switched on and before being switched off, that is the switching shall not be regarded a time dependent change.

According to the invention, the voltage changes within a passivation region of the metal in said corrosion inhibitor. The passivation region in this understanding is a region of voltage in which the corrosion inhibitor effects an inhibition of corrosion of the metal. This limitation is due to the fact that the corrosion inhibitor will not inhibit the corrosion if the applied voltage is below a minimum threshold or beyond a maximum threshold. The term "region of voltage" means an interval of voltage between the minimum threshold and the maximum threshold. The precise values of the upper and lower threshold and the region of voltage depend on the metal as well as the corrosion inhibitor used.

Normally, pitting decreases the inhibition. It is therefore preferred that the voltage is always smaller than the pitting voltage of the metal in the corrosion inhibitor solution. Here, the pitting voltage is the lowest voltage at which pitting occurs in the metal in the corrosion inhibitor solution. The pitting voltage depends on the metal as well as the corrosion inhibitor. The pitting voltage is generally positive. If the voltage remains smaller than the pitting voltage, a decrease of the inhibition effect due to pitting can be avoided.

Preferably, the passivation region can be a region in which stable pitting corrosion of the metal does not occur when the metal is in contact with the corrosion inhibitor solution.

The metal can be any metal used for example in a heating system such as steel, copper, brass, solder (tin), stainless steel and the like.

Preferably, the metal, the corrosion of which shall be inhibited, is copper or comprises copper.

The corrosion inhibitor can preferably comprise or consist of Benzotriazole, BTA, or a derivative of Benzotriazole or a mixture of Benzotriazole and Triethanolamine, TEA, or a mixture of a derivative of Benzotriazole and Triethanolamine. These substances are in particular effective if the metal is copper. Preferably, the corrosion inhibitor does not contain a solvent except for water.

In a preferred embodiment of the invention the voltage which changes time-dependently after being switched on and before being switched off, is a swept voltage or a pulsed voltage or a voltage having a wave form, preferably a saw tooth form. These voltage profiles show a particularly good corrosion inhibition in both cases where the metal is in contact with the inhibitor solution and where the metal is no longer in contact with the corrosion inhibitor solution.

Preferably, the voltage changes at a rate of greater or equal 0.5 mV/s, preferably greater or equal 0.7 mV/s and/or lower or equal 2 mV/s, preferably lower or equal 1.5 mV/s, preferably of 1 mV/s.

In a preferred embodiment, the voltage can have a modulated frequency with alternated negative and positive whole cycles or positive cycles or negative cycles.

Possible voltage forms include pulsed unipolar or pulsed bipolar voltages as well as sine wave and saw tooth voltage forms.

As discussed above, the voltage preferably varies between a maximum threshold and a minimum threshold. Preferably, the maximum threshold, that is the maximum voltage which is applied, is 0.4 V, preferably 0.3 V, preferably 0.25 V, preferably 0.15 V, preferably 0.1 V, preferably 0.08 V.

Preferably, the minimum voltage applied, that is the lower threshold, is −0.8 V, preferably −0.4 V, preferably −0.2 V, preferably −0.15 V.

Above-mentioned values are in particular suitable if the metal is copper.

Surprisingly, it has been found that the inhibition is improved if the voltage repeatedly sweeps within the passivation region and in particular between the minimum voltage and the maximum voltage. It is therefore preferred that in the method of the invention the voltage sweeps between the minimum voltage and the maximum voltage at least two times, preferably at least four times, preferably at least six times.

As already discussed above, an inhibition of corrosion is also observed in a system in which the metal had been in contact with the inhibitor solution but is no longer in contact with the inhibitor solution. In a preferred embodiment of the invention, the metal can therefore in a first step be brought in contact with the corrosion inhibitor solution, and the voltage is then applied in a second step after the first step, in which second step the metal had contacted the corrosion inhibitor solution and is no longer in contact with the corrosion inhibitor solution. Surprisingly, it has been found that also in this case the application of the changing voltage improves the corrosion inhibition. The corrosion inhibition is even further improved with increasing number of voltage cycles. It should be noted that this effect does not require that the metal is in contact with the corrosion inhibitor solution during application of the voltage, however, it shall not be excluded that remains of the corrosion inhibitor are present in contact with the metal.

In an optional embodiment of the invention, a voltage, preferably a swept voltage is applied while the metal is in contact with the corrosion inhibitor solution. Preferably, the voltage varies within the passivation range for the metal in the corrosion inhibitor. If the metal is for example copper, the voltage preferably varies between −0.8 V and +0.4 V.

The invention can be employed with particular advantage in piping systems or closed loop heating systems or any other water piping system, in particular domestic piping systems. In this case, said metal, the corrosion of which is to be inhibited, can be the metal of this system, for example the metal of the pipes. Here, the auxiliary electrode can advantageously be at least partially formed as a wire running through at least one pipe. The auxiliary electrode is therefore present in the space where the water is contained in the system.

In a preferred embodiment, the auxiliary electrode formed as a wire is held at a distance to an inner wall of the respective pipe or metal structure by at least one or a plurality of spacers. The spacers can for example be polytetrafluoroethylene spheres having a diameter equal to or smaller than an inner diameter of the pipe through which the wire is running. The diameter of the pipe is here measured in the cross section of this pipe if this is assumed to be circular.

The auxiliary electrode can preferably comprise or consist of copper and/or titanium.

It is not necessarily required that the above-described method according to the invention is employed all the time. In a preferred embodiment, the voltage due to corrosion between the metal and the auxiliary electrode is measured and said voltage, which is applied between the metal and the auxiliary electrode, is switched on when said voltage due to corrosion becomes greater than a predetermined threshold. This allows to fixedly or permanently arrange an apparatus for carrying out the method within the system in which corrosion is to be inhibited.

The invention is also related to an apparatus for inhibiting corrosion of metal in a system in which system the metal is in contact with water and a corrosion inhibitor inhibits corrosion of metal. Regarding the system and the corrosion inhibitor which inhibits the corrosion of metal, above discussion relating to the method applies analogously and is therefore not repeated here.

The apparatus according to the invention comprises means for applying a voltage between the metal and an auxiliary electrode, such that said voltage changes time-dependently after being switched on and before being switched off within a passivation region of the metal in said corrosion inhibitor.

Preferably, the apparatus according to the invention is adapted for performing a method according to the invention as described above. All statements made for the method therefore apply for the apparatus, too.

In the following, the invention will be explained exemplary with references to the figures.

BRIEF DESCRIPTION OF THE DRWAINGS

FIGS. 3A and 3B show the multi-cycle numbered sweeps as shown in FIG. 2, wherein FIG. 3A is the Cathodic region and FIG. 3B is the Anodic region.

FIG. 5A shows the Cathodic region and FIG. 5B shows the Anodic region.

Figure 6A:
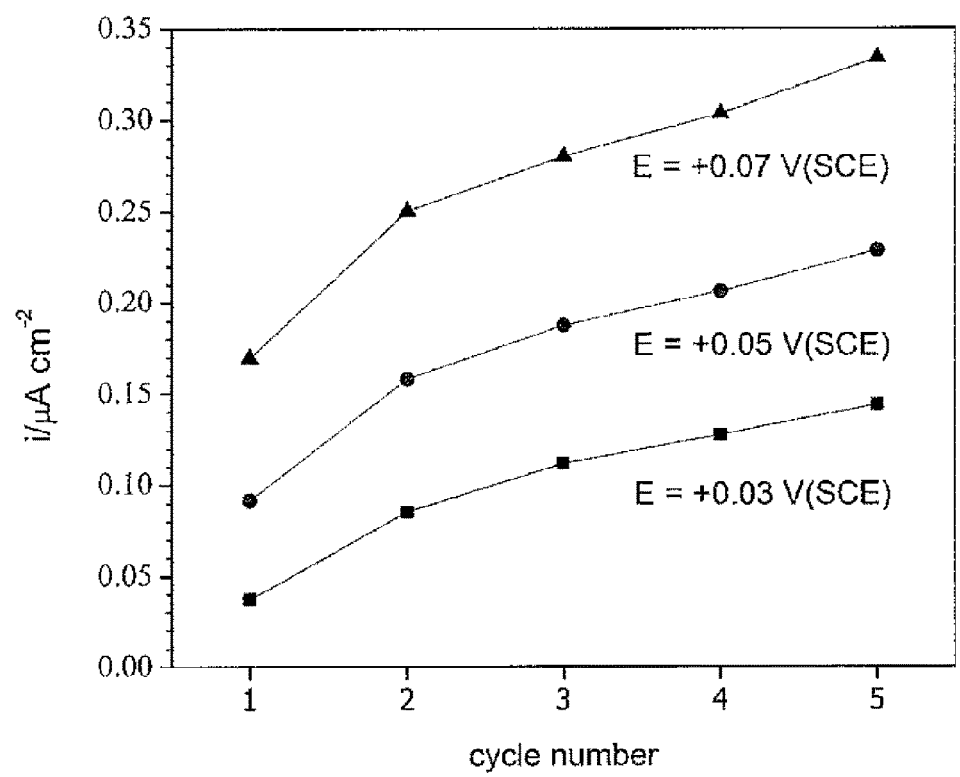
Figure 6B:
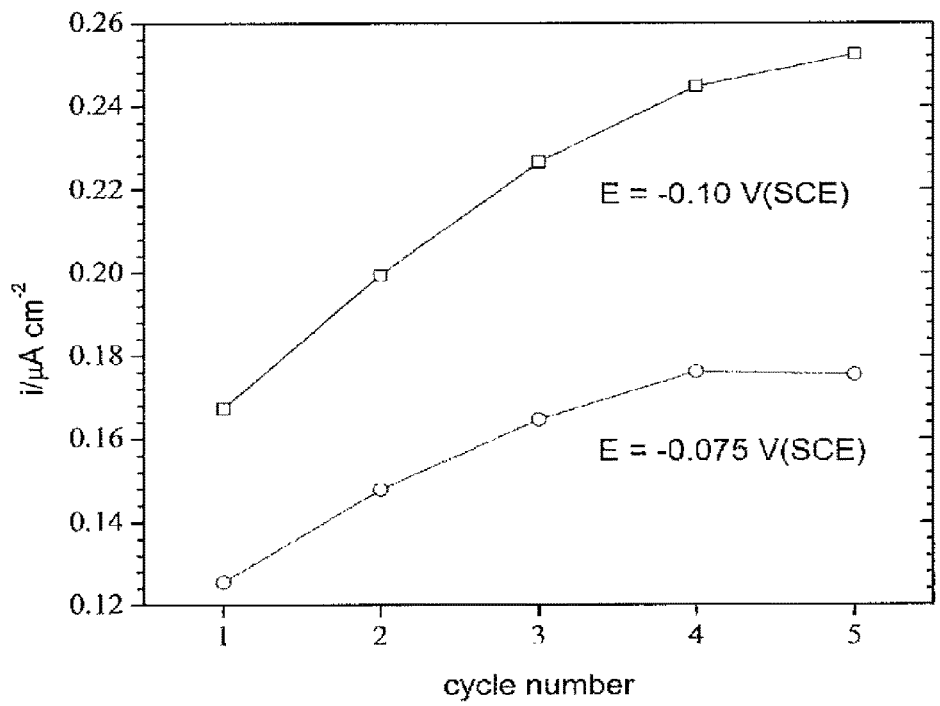

FIG. 6A shows the effect of the cycle number on the current density for the positive sweep at E=0.03 V(SCE); E=0.05 V(SCE) and E=0.07 V(SCE) and FIG. 6B shows the effect of the cycle number on the current density for the negative sweep at E=−0.075 V(SCE) and E=−0.10 V(SCE). Data are measured from polarisation in uninhibited tap water after cyclic polarisation in 25% Fernox®.

Figure 7:
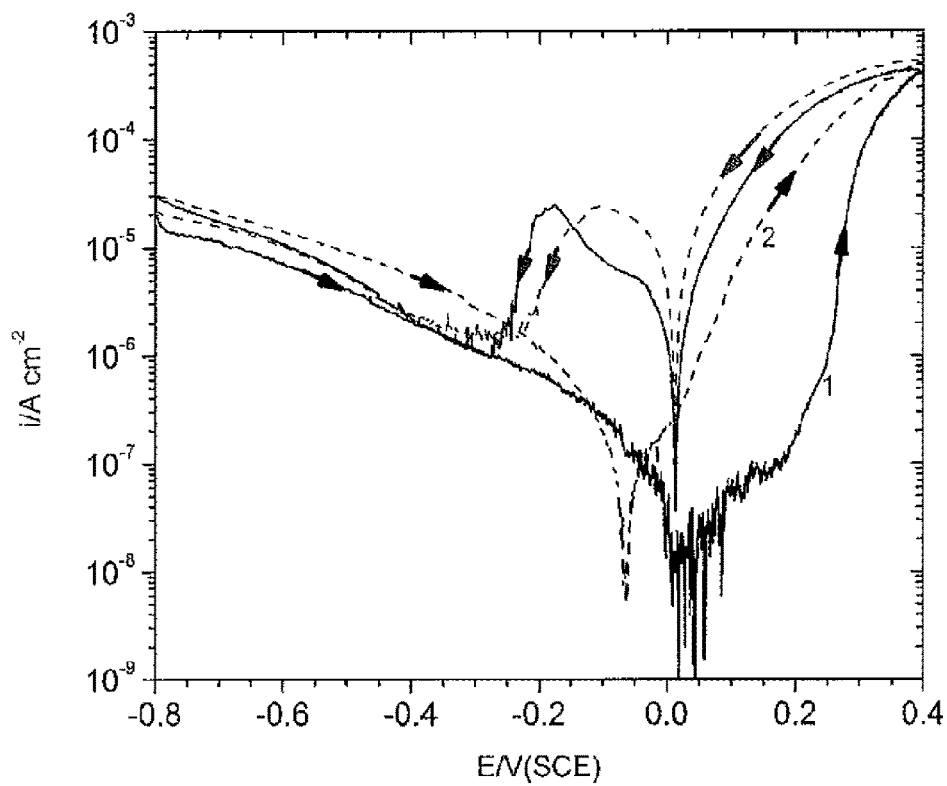

FIG. 7 shows polarisation curves for copper in inhibitor-free tap water after polarisation in 4.7 mM BTA inhibited tap water at 25±0.1° C. Results of 2 cycles are shown: solid line—1st cycle; dashed line—2nd cycle.

Figure 8:
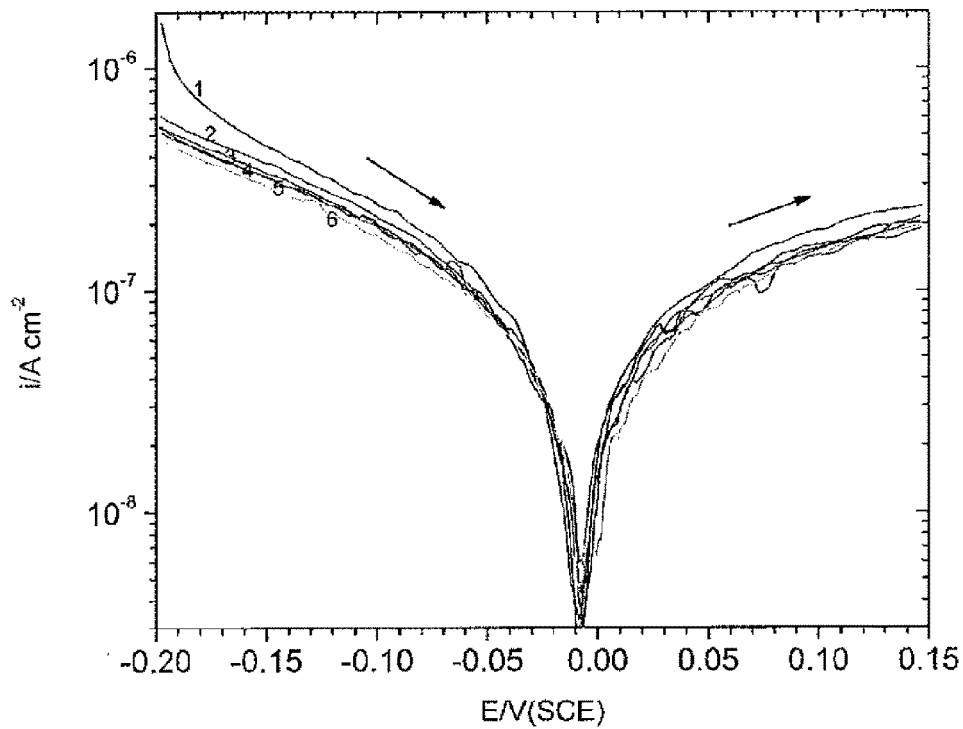

FIG. 8 shows multiple cycle CV polarisation curves (positive sweeps, meaning −ve to +ve voltage) for copper in inhibitor-free Cambridge tap water after polarisation in 4.7 mM BTA-inhibited tap water at 26±1° C.

Figure 9A:
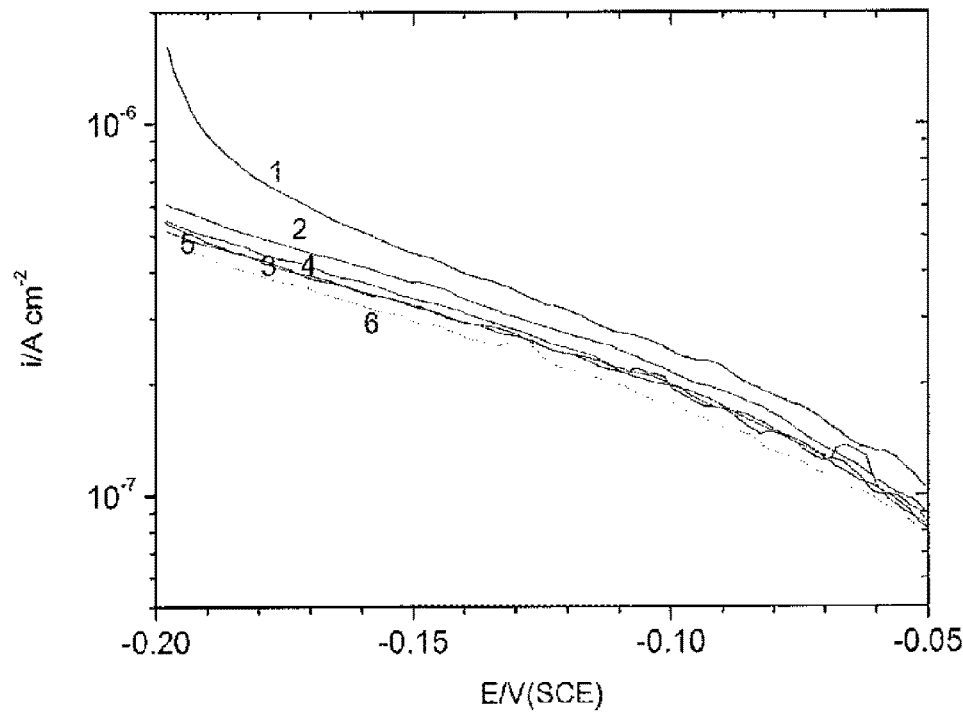
Figure 9B:
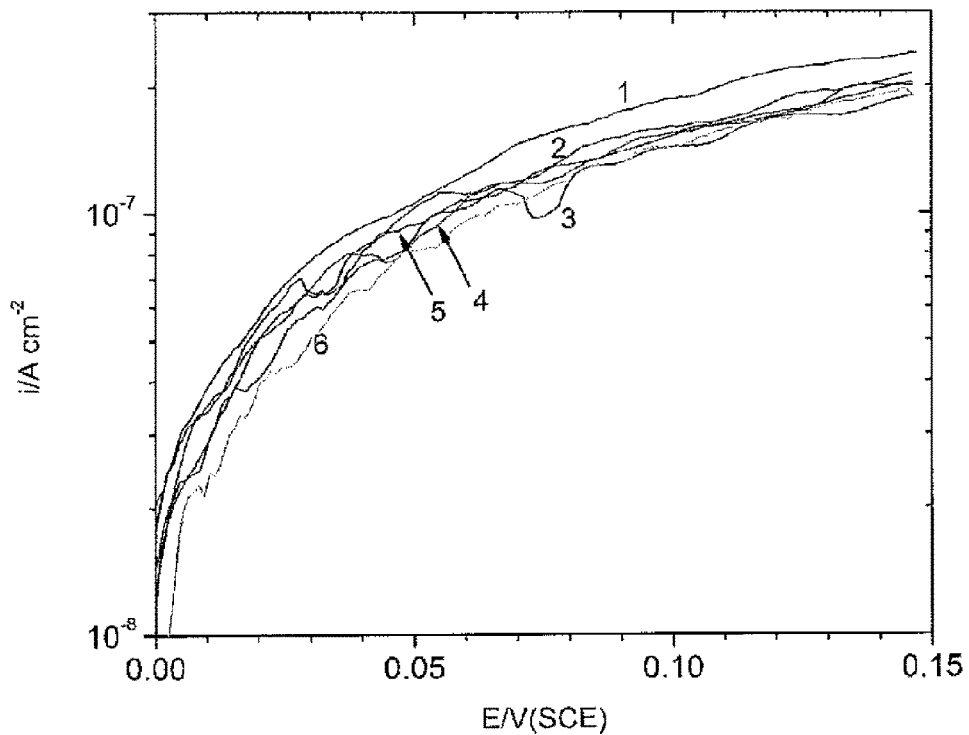

FIGS. 9A and 9B show polarisation curves as shown in FIG. 8, wherein the number labels are the sweep numbers. FIG. 9A shows the Cathodic region; FIG. 9B shows the Anodic region.

Figure 10A:
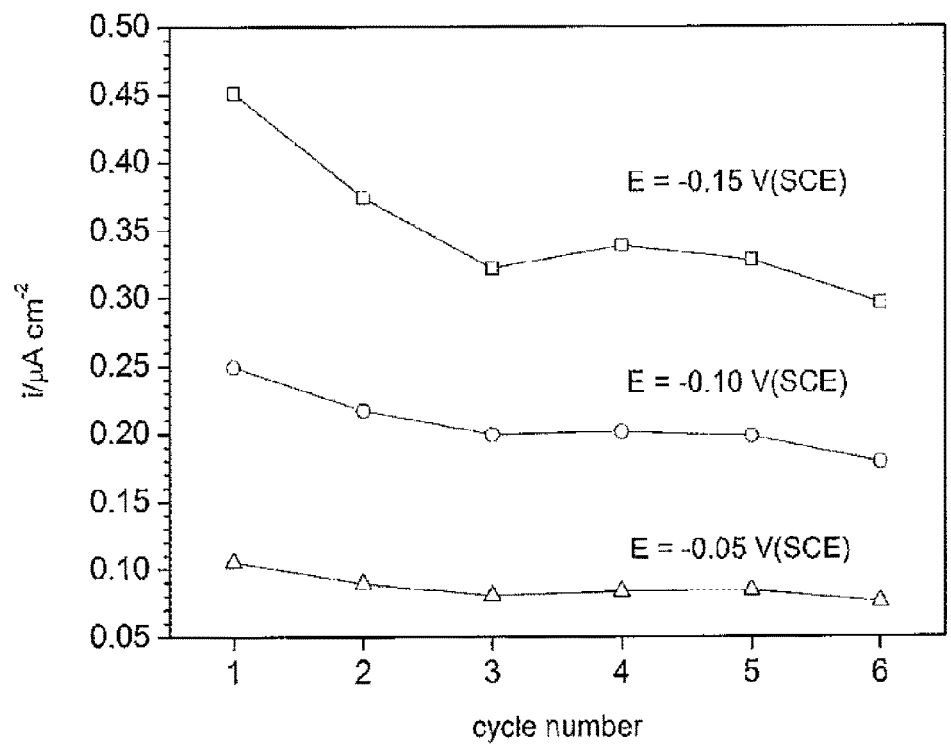
Figure 10B:
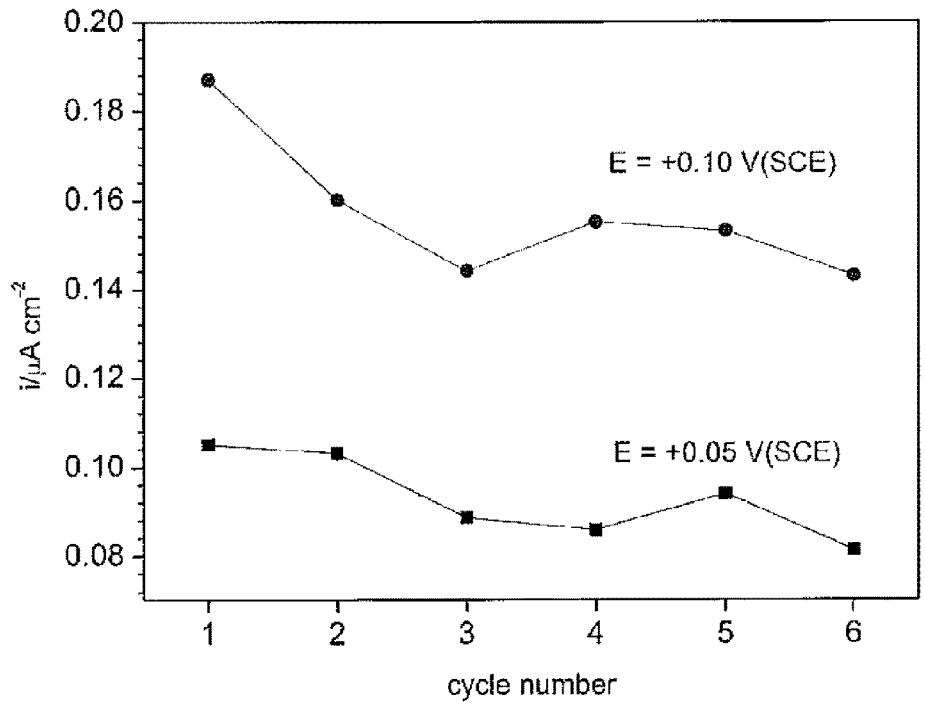

FIG. 10A shows the effect of the cycle number on the current density for the negative sweep at E=−0.15 V(SCE); E=−0.10 V(SCE) and E=−0.05 V(SCE) and FIG. 10B shows the effect of the cycle number on the current density for the positive sweep at E=+0.05 V(SCE) and E=+0.10 V(SCE). The data have been measured from polarisation in uninhibited tap water after cyclic polarisation in 4.7 mM BTA-inhibited tap water.

Figure 11:
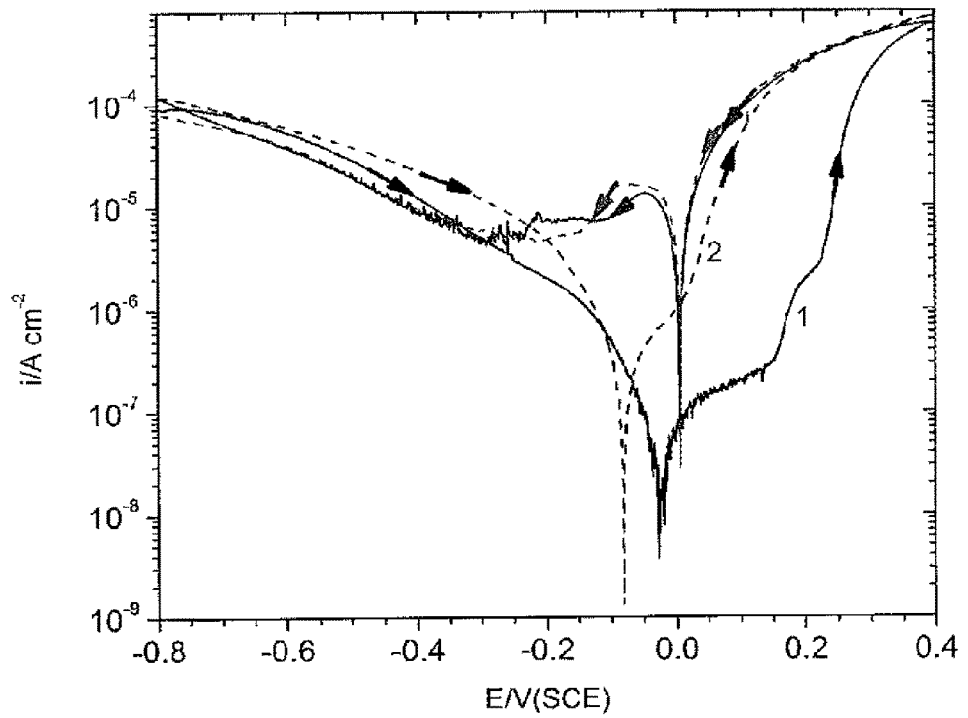

FIG. 11 shows polarisation curves for copper in inhibitor-free tap water after polarisation in 4.7 mM BTA and 30 mM TEA inhibited tap water at 25±0.1° C. The results of two cycles are shown: solid line—1st cycle; dashed line—2nd cycle.

Figure 12:
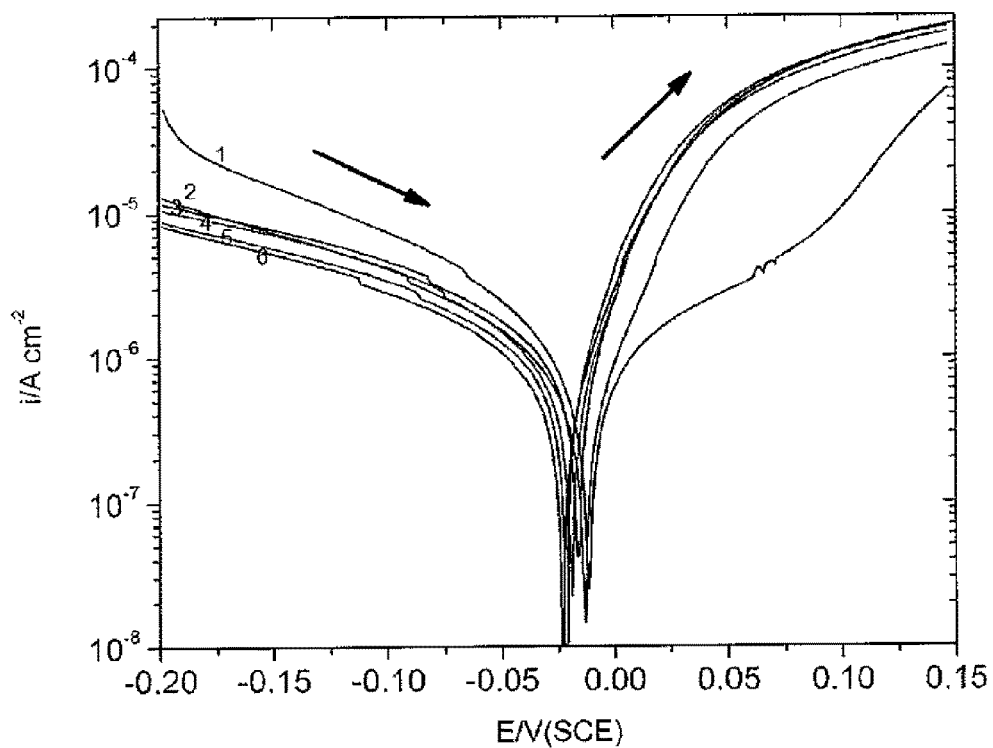

FIG. 12 shows multiple cycle CV polarisation curves (positive sweeps, meaning −ve to +ve voltage) for copper in inhibitor-free Cambridge tap water after polarisation in 4.7 mM BTA and 30 mM BTA-inhibited tap water at 26±1° C.

Figure 13A:
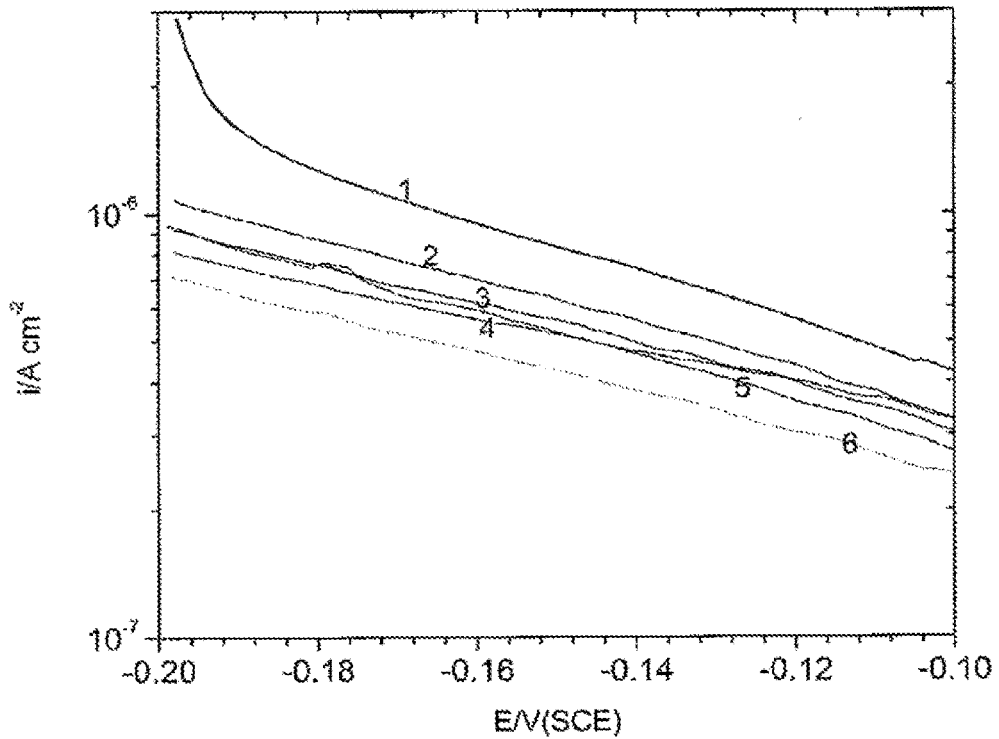
Figure 13B:
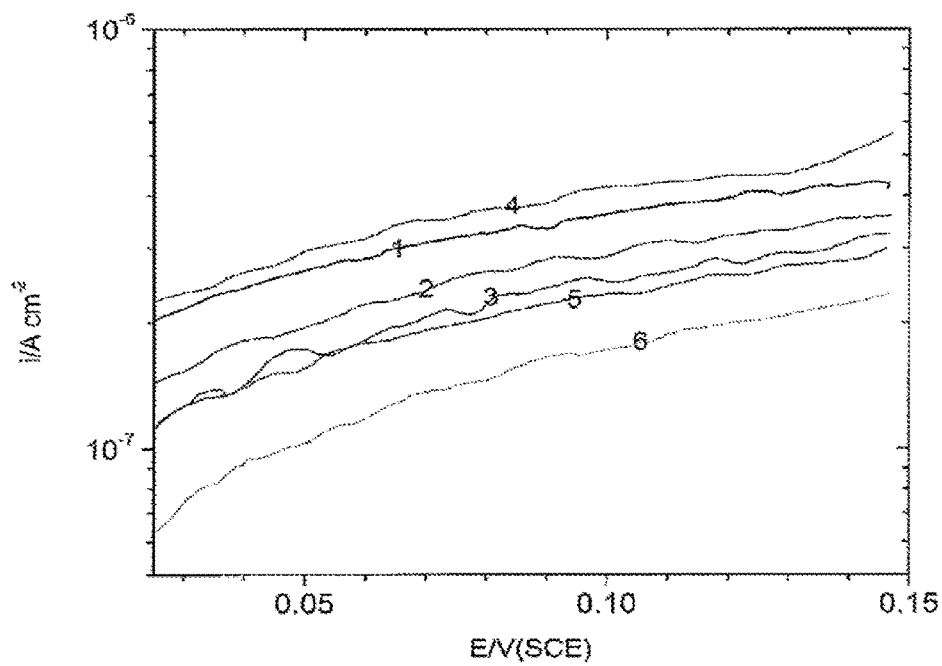

FIGS. 13A and 13B show polarisation curves shown in FIG. 12. The number labels are the sweep numbers. FIG. 13A shows Cathodic region and FIG. 13B shows Anodic region.

Figure 14:
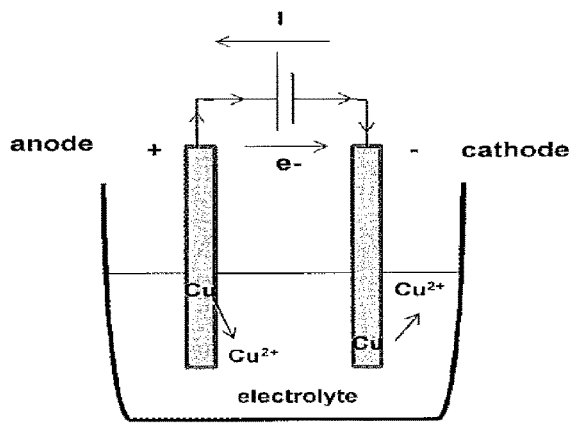
Figure 15:
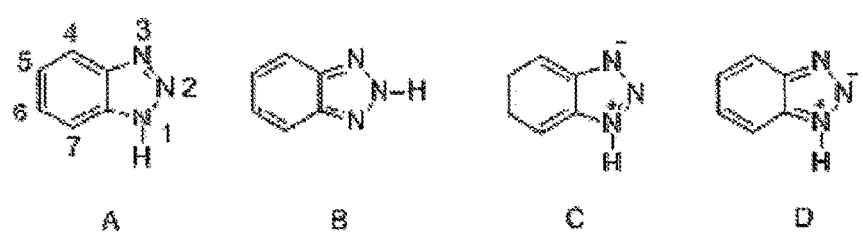
Figure 16:
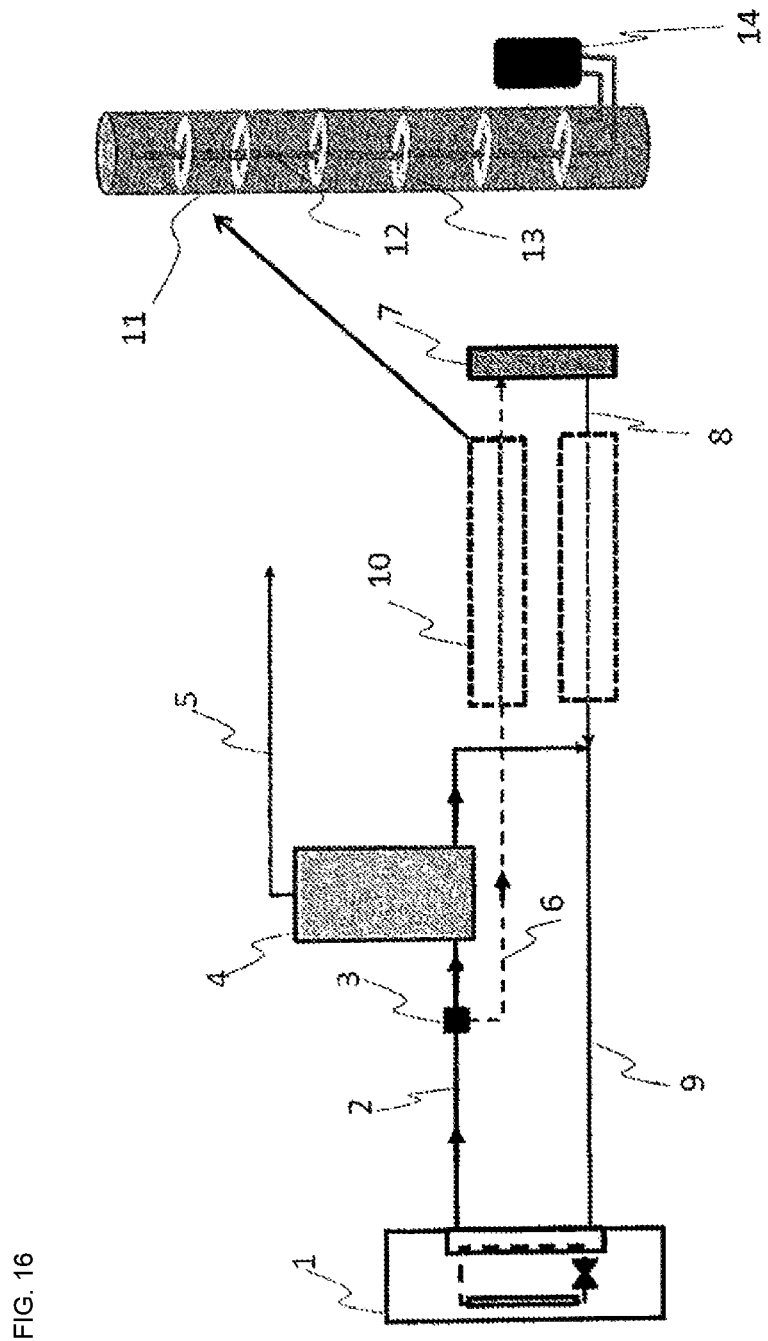

FIG. 14 shows an electrochemical circuit suitable for carrying out the present invention FIG. 15 shows different derivatives of Benzotriazole, FIG. 16 shows a domestic heating system with an apparatus suitable to carry out the invention and FIGS. 17A to 17D show different voltage forms which can be employed in the present invention.

DETAILED DESCRIPTION OF PREFERRED EMBODIMENT

In the following, some examples are given showing the effect underlying the invention. It becomes clear from the examples that this effect is not limited to the precise values shown in the examples but rather exists in wide range of settings even if the effect might be smaller in certain settings.

In a first example, a three-electrode cell of volume 160 ml containing tap water (Cambridge tap water) was used in uninhibited form or in previously inhibited form containing 25% (by volume) Fernox®. The separate inhibitors were also examined: 4.7 mM benzotriazole (BTA) and a combination of 4.7 mM BTA and 30 mM TEA. The concentrations of BTA and TEA correspond to those present in 25% Fernox®. BTA and TEA were from SIGMA-ALDRICH. A Ø6.35 mm Cu rod (ADVENT, Oxford, UK, purity 99.99+%) mounted into epoxy resin with only the circular end surface exposed. The end surface was finished to 2400 (or 2500) grit with silicon carbide paper. This formed the working electrode (WE). The Cu electrode was left in air for 1 hour before testing. A Ag/AgCl electrode equilibrated with tap water, or a saturated calomel electrode (SCE) was used as the reference electrode (RE). A graphite rod formed the counter electrode. Analysis data of Cambridge tap water and components of Fernox® Alphi 11 are shown in Table 1a and Table 1b. Note that Cambridge tap water is regarded as hard.

TABLE 1a

| Cambridge tap water | |
|---|---|
| | mg L$^{-1}$ |
| K$^+$ | 0.3 |
| mg$^{2+}$ | 2.4 |
| Ca$^{2+}$ | 121.0 |
| Cl$^-$ | 26.5 |
| NO$_3^-$ | 0.1 |
| PO$_4^{3-}$ | 39.4 |
| SO$_4^{2-}$ | 3.0 |
| Alkalinity | 206 |
| pH | 7.56* |
| Conductivity/μS cm$^{-1}$ | 652* |

TABLE 1b

| Fernox ® Alphi 11 | |
|---|---|
| | mg kg$^{-1}$ |
| Cl- | 20 |
| SO42- | <2 |
| triethanolamine | 4300 |
| benzotriazole | 540 |
| PO3 | <2 |
| Ptotal | <10 |
| propylene glycol | 99 wt % |
| pH | 7.8 |

Table 1a and Table 1b; Analysis data of Cambridge tap water and Fernox® Alphi 11 (data supplied by Mitsubishi Electric, UK; *: measured by the authors in the Cambridge laboratory)

Calibration for the Ag/AgCl Reference Electrode

Home-made Ag/AgCl electrodes or saturated calomel electrode (SCE) were used as the reference electrodes for cyclic voltammetry (CV). The Ag/AgCl electrode was made from a sheet of silver (40 mm×40 mm) crimped to a piece of silver wire (Φ1 mm) and anodized in 1 M HCl solution for 10 min to produce a thick film of AgCl. A Solartron 1286 electrochemical interface was used to control the polarising process. For Fernox®-inhibited solutions, the reference potential of the Ag/AgCl electrode was affected by the presence of Fernox®. The potential of the Ag/AgCl reference electrode was calibrated against a saturated calomel electrode (SCE) in both inhibitor-free tap water and inhibitor-containing tap water (25 vol % Fernox®). The value of $E_{Ag/ACl}$ in inhibitor-free tap water was +160 mV(SCE), and in Fernox®-containing tap water was +54 mV(SCE). Both were calibrated regularly.

The potentials present in this document are all presented relative to the SCE scale.

Persistence of Inhibition

The persistence of inhibition was examined using cyclic voltammetry as follows.

First, CV of Cu was carried out in tap water. The sample was then reground and CV was carried out in Fernox®-inhibited, or BTA, or the mixture-inhibited tap water. Two consecutive sweeps were carried out with the potential range of −0.8 V(SCE) to +0.4 V(SCE) at a sweep rate of 1 mV s$^{-1}$.

This sample was then removed from the inhibited solution, washed thoroughly with twice-distilled water, and immersed once again into inhibitor-free tap water for further repetitive CV measurements. These last measurements were thus made in inhibitor-free tap water, but with a surface still carrying any residual inhibition film from the inhibited solutions after washing. Cyclic voltammograms of Cu in tap water without inhibitor, and after experiments with inhibitor are compared, both in uninhibited tap water. For these, the potential was swept linearly from −0.8 V(SCE) to +0.4 V(SCE) at a sweep rate of 1 mV s$^{31\ 1}$ in tap water and in tap water after previous inhibition. All these tests were carried out thermostatically controlled at 25±0.1° C. in stirred solutions without deaeration. After two sweep cycles in previously inhibited tap water, the potential range was narrowed down according to the passivation region obtained. Multiple sweep cycles were carried out under thermostatic control, generally at 26±1° C., but with one experiment at 22±2° C. All were done without stirring.

Figure 1:
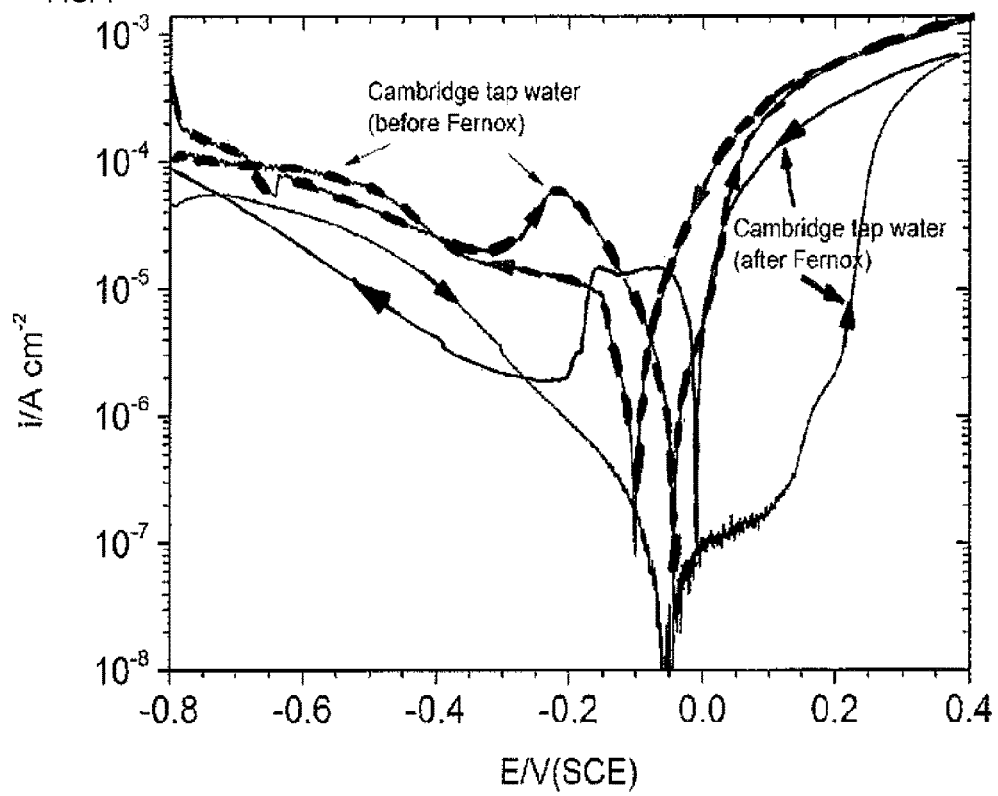
FIG. 1 shows polarisation curves for copper in inhibitor-free tap water without prior inhibition, and in inhibitor-free tap water after polarisation in 25% Fernox® inhibited tap water at 25±0.1° C.

Persistence Tests in Tap Water After Previous Inhibition in Fernox®-inhibited Tap Water FIG. 1 presents the cyclic voltammetry of copper in uninhibited tap water and in inhibitor-free tap water after polarisation in Fernox®-inhibited tap water. It shows that the corrosion potential for the positive sweep for the surface which had previously been in inhibited tap water is very close to that which had not previously been in contact with the inhibitor. Prior inhibition followed by thorough washing with twice-distilled water and re-immersion in uninhibited tap water, shows the inhibition to be still clearly present on the metal surface. There is a highly inhibited region with the potential range from 0 V(SCE) to +0.12 V(SCE) and the anodic current density increases slightly with potential but remains at around $10^{-7}$ A cm$^{-2}$. Two regions succeed the highly inhibited region: when the potential is swept above +0.12 V(SCE), the inhibition is decreased and passes into the pitting region. Initially, there is a slow rise in current with increasing potential, reaching an inflection point at ca. 0.2 V(SCE). After this, the current rises more sharply and continuously to the top of the sweep. This contrasts the polarisation curve of copper in tap water without prior inhibition: clearly there can be no highly inhibited region. There is however, a small inflection point at the potential of +0.02 V(SCE) followed by the sharp increase in current density arising from pitting corrosion. Although we do not know the exact origin of this uninhibited inflection, it appears that Fernox® acts on this surface to provide the highly inhibited region which now is extended to +0.12 V(SCE).

Inhibition of both anodic and cathodic reactions is found: the current densities after prior inhibition are very much lower than those with no prior inhibition, throughout the entire polarisation curves. We term this phenomenon "residual inhibition" or "persistence of inhibition" because the residual inhibitor continues to act when there is no inhibitor in the water. The residual inhibition appears to be robust, with the current 3 to 4 orders of magnitude lower in the anodic region and 0.5 to 1 order of magnitude lower in the cathodic region. The inhibition is decreased when the potential is swept above the pitting potential (ca. +0.12 V(SCE) shown in FIG. 1), but even here, the rate of rise of log (current density) with increase in potential is much slower than with copper which has not been previously inhibited.

The following reactions give possible reactions occurring during the copper corrosion process in tap water [41].

$$Cu_2O+2H^{++}2e^{-}=2Cu+H_2O \quad (i)$$

$$CuO+2H^{++}2e^{-}=Cu+H_2O \quad (ii)$$

$$CuO+2H^{++}2e^{-}=Cu_2O+H_2O \quad (iii)$$

Figure 2:
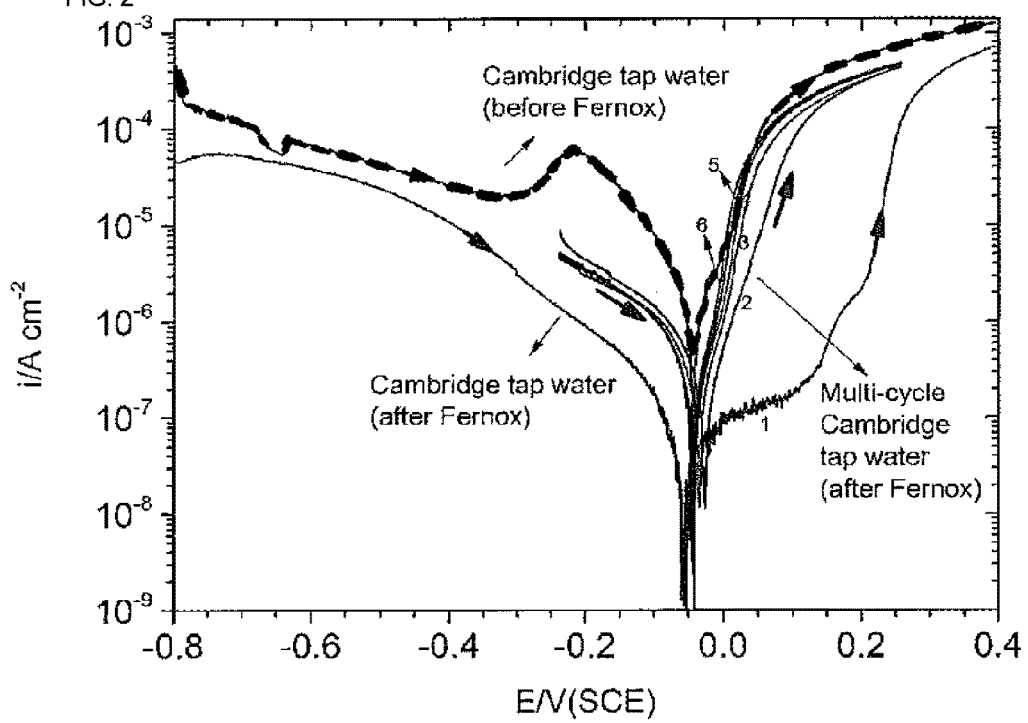
FIG. 2 shows polarisation curves (positive sweeps, meaning −ve to +ve voltage) for copper polarised in Cambridge tap water before (shown in black broken lines) and after (labelled as 1) Fernox®. After curve 1, the scanning potential range was narrowed down to −0.25 V(SCE) to +0.25 V(SCE) for multi-cycle polarisation: these are labelled as 2-6 in Cambridge tap water after Fernox® at 25±0.1° C.
Figure 3A:
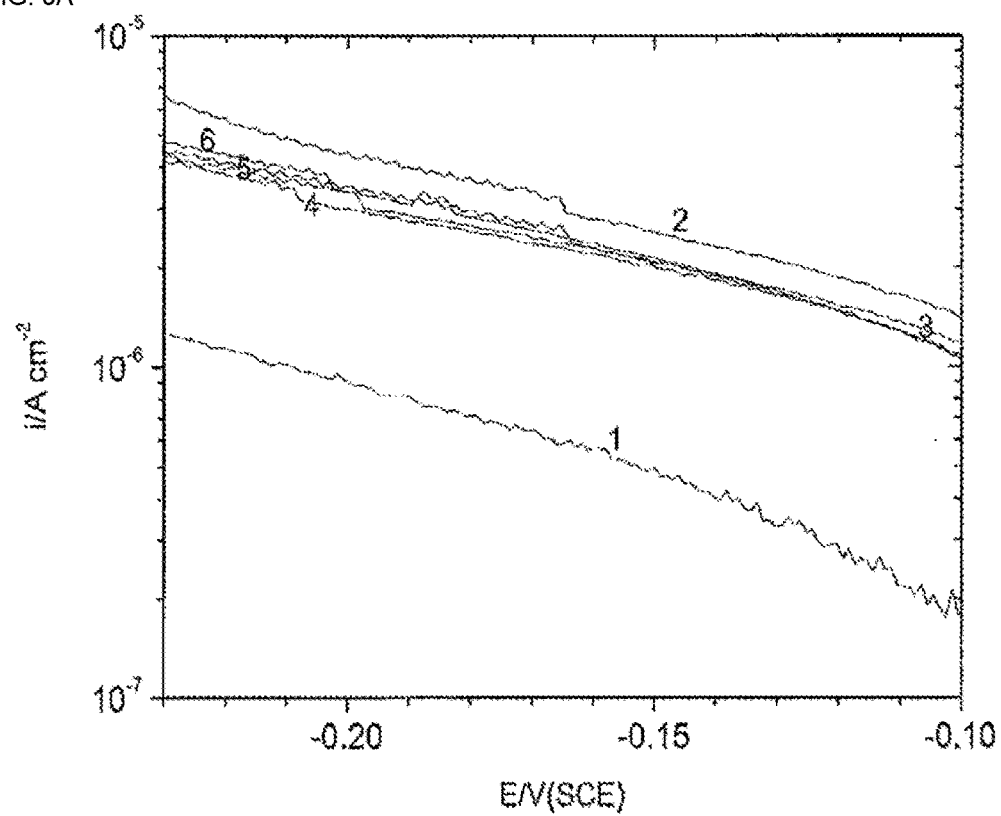
Figure 3B:
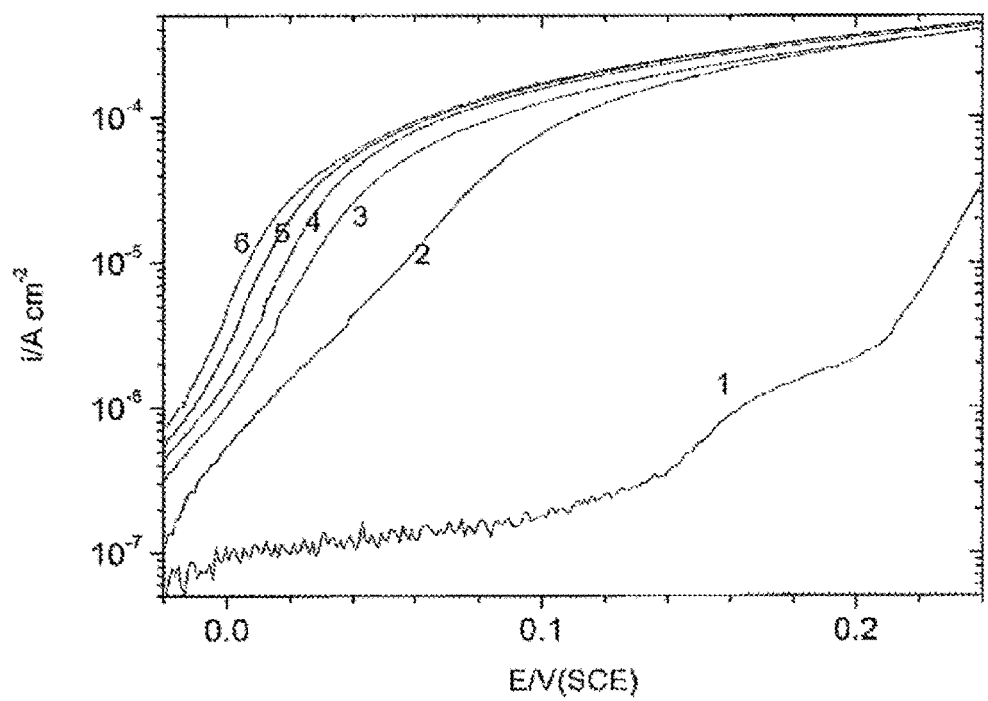

FIG. 2 shows the CV polarisation curves (positive sweeps, meaning −ve to +ve voltage) for copper polarised in Cambridge tap water before and after prior Fernox®-inhibition at 25±0.1° C., both in uninhibited tap water. The curve labelled as 1 is the first sweep in tap water after inhibition and subsequent washing, with the full scanning potential range of −0.8 V(SCE) to +0.4 V(SCE). The curves labelled 2 to 6 were then prepared by continuous scanning under the narrowed polarising potential range of −0.25 V(SCE) to +0.25 V(SCE) to produce multiple cycles after the first full range potential sweep. These are all measured from the same sample surface, and the curves 1 to 6 in FIG. 2 are consecutive. FIGS. 3A and 3B show the same data plotted over a narrower range of potential to demonstrate the order of the consecutive scans in detail, using the same data identification as that in FIG. 2. They show that Cu was activated after the first polarisation under the full potential range and remained active thereafter. However, note that even in this treatment, the narrowed potential range cycles show increasing currents with increasing cycle number, showing that even here, there is still some residual inhibition. The anodic current density does increase with increasing sweep number, demonstrating the metal is actually activating with successive sweeps: whilst this may appear to be obvious, it actually demonstrates that the inhibitor still persists on some parts of the surface, despite the fact that pitting has removed some inhibited areas in the preceeding sweeps. FIGS. 3A and 3B also show that the cathodic reaction is not much affected by successive sweeps after the first sweep: the first sweep through the cathodic region is made of course, before any breakdown has occurred in that sweep.

Figure 4:
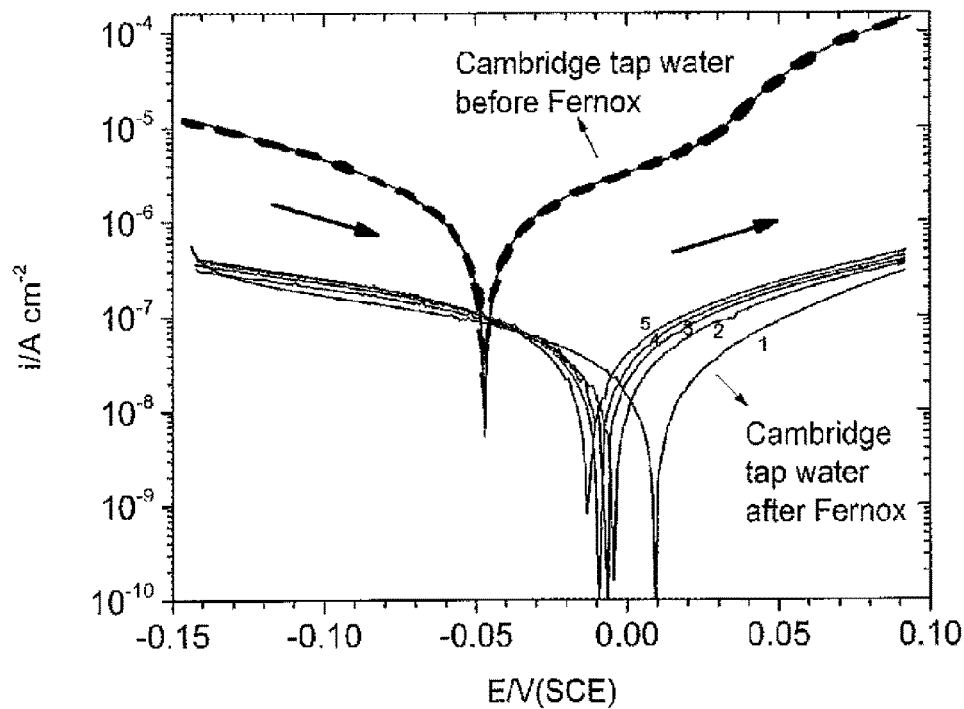
FIG. 4 shows multiple cycle cyclic voltammetry (CV) polarisation curves (positive sweeps, meaning −ve to +ve voltage) for copper in inhibitor-free Cambridge tap water after polarisation in Fernoe-inhibited tap water at 22±2° C. Number labels give the sequence of the sweeps.
Figure 5A:
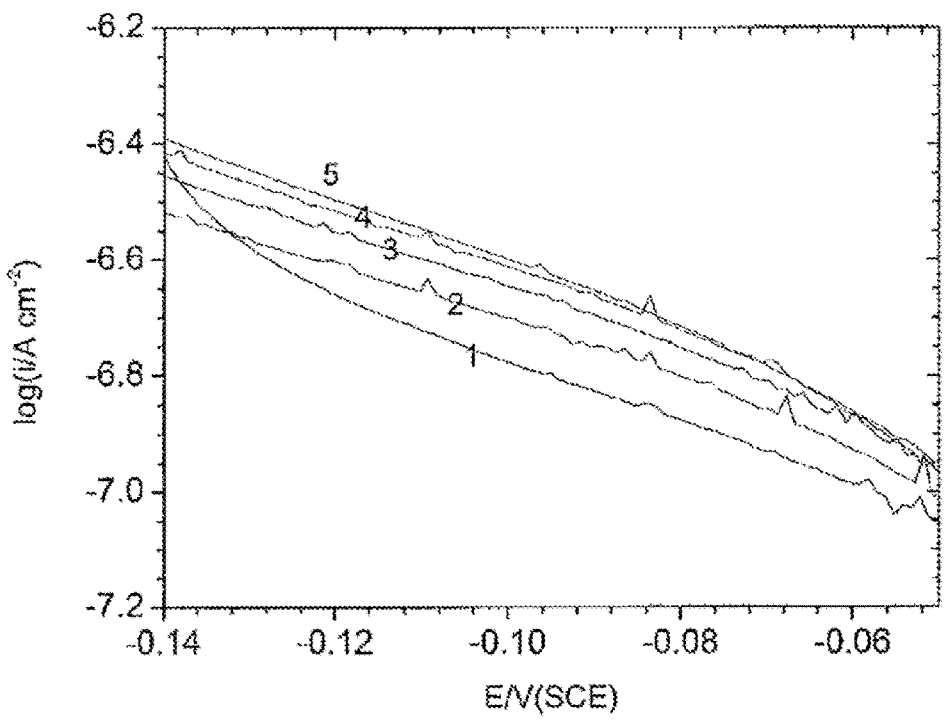
FIGS. 5A and 5B show the polarisation curves shown in FIG. 4, the number labels are the sweep numbers.
Figure 5B:
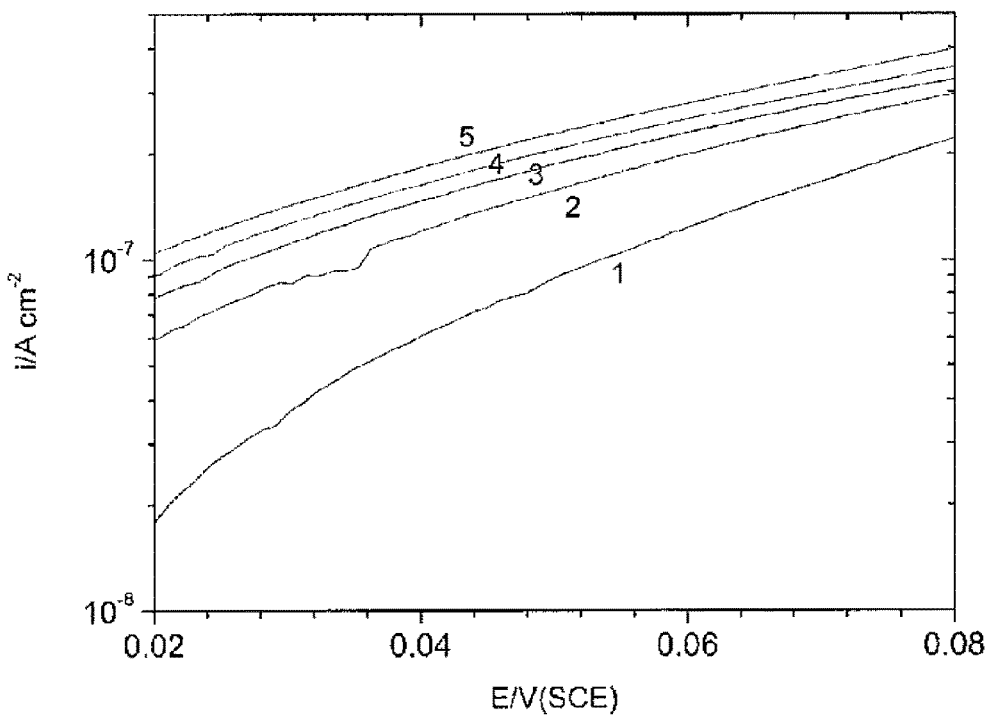

To distinguish the effect of the full range polarisation which was scanned from −0.8 V(SCE) to +0.4 V(SCE) (see FIG. 2), experiments conducted by polarising the sample for a narrower range of potential of only −0.14 V(SCE) to +0.09 V(SCE) using similar multiple consecutive cycles were carried out and the results are shown in FIG. 4. The polarisation curves in FIG. 4 were measured in uninhibited tap water, showing the effects of prior inhibition. Again, the detailed narrow-range parts are shown, in FIGS. 5A and 5B. The purpose of this narrower range scan is to show the effect of inhibitor persistence without passing into the higher potential pitting region.

Five potential cycles swept from −0.14 V(SCE) to +0.09 V(SCE) are shown, and it is clear that the Cu metal remains inhibited: the inhibitor is still clearly present and effective on the metal surface, demonstrating residual inhibition. There is however, a very slow and small rise in both the anodic current density and the cathodic current density with increasing cycle number. Note that the current densities do not approach the values for the metal which had no prior inhibition, and in fact, the activation caused by cycling appears to reach an asymptotic maximum.

FIG. 7 gives the CV of Cu in uninhibited tap water after polarisation in 4.7 mM BTA inhibited tap water. This previously inhibited sample shows behaviour similar to that in tap water after prior inhibition in Fernox®. There is a peak at −0.18 V(SCE) on the reverse negative sweep at the cathodic region which is due to the reduction of copper corroded in the anodic region. The solid line gives the first cycle sweep and the dashed line gives the second cycle: the cycles are consecutive. It is clear that the current density is higher for both anodic region and cathodic region than the first cycle which indicates the loss of inhibition. FIG. 7 shows a heavily inhibited region (compare the data from Fernox®, FIG. 1) with a potential range of +0.05 V(SCE) to +0.2 V(SCE) and the current density is below $10^{-2}$ A cm$^{-2}$. This highly inhibited potential range which is well maintained is even wider than that in Fernox® by ca. 80 mV.

Similar persistence tests in uninhibited tap water after polarisation in BTA-inhibited tap water using a narrowed potential range between −0.2 V(SCE) to 0.15 V(SCE) was applied for the cyclic sweeps after polarisation scanned from −0.8 V(SCE) to 0.4 V(SCE). The narrowed potential range was determined according to FIG. 7 to avoid the pitting region. FIG. 8 gives the multiple cycle polarisation curves in the narrowed region with FIGS. 9A and 9B showing detailed plots using the same coding as for the polarisation curves in FIG. 8. The results show that the inhibition effect persists in inhibitor-free tap water after prior inhibition by BTA and the current densities in this case decrease with increasing cycle number, showing the strengthening of the inhibition with the successive polarisation.

The role of cycle number is quantified in FIGS. 10A and 10B. The persistence effect becomes stronger with this aging procedure.

The persistence of prior polarisation in the mixture of 4.7 mM BTA and 30 mM TEA were also examined and is shown in FIG. 11 (two successive cycles). The form of behaviour is similar to that after inhibition in Fernox® (FIG. 1) and in tap water after inhibition in BTA only (FIG. 7). An inhibited region between potential of −0.04 V(SCE) to +0.18 V(SCE) was seen.

6 cycles with a narrow potential range of −0.20 V(SCE) to +0.15 V(SCE) were scanned as shown in FIG. 12 with FIGS. 13A and 13B giving the detail. The inhibition persisted after removal from the inhibited tap water. Although the scatter is larger here, there appears to be a trend towards decreasing current density in the persistence test with increasing cycle number, similar to that in BTA and opposite that in Fernox®.

FIG. 14 shows an electrochemical circuit suitable for carrying the present invention. In this example, a direct current is applied between an anode and a cathode which are immersed in an electrolyte. In this example, the anode as well as the cathode can comprise copper or consist of copper. The electrolyte can be the corrosion inhibitor solution or the pure tap water depending on the example.

FIG. 15 shows different derivatives of benzotriazole. Normally, benzotriazole exists as shown in structures A and B. The structures C and D can be produced as derivatives of the structures A and B.

FIG. 16 shows a domestic heating system including an apparatus suitable to carry out the method described above. On the right side a magnified detail is shown. As most common heating systems the system shown in FIG. 16 has a heat source 1 and a heat emitter 7 which are connected by a hot water pipe 2 and a return water pipe 9. A hot water tank 4 is placed in the hot water pipe 2 and can supply hot water to a domestic hot water supply 5. A three way valve 3 is provided in the hot water pipe 2 through which water can be guided into a pipe 6 towards the heat emitter 7 while bypassing the water tank 4. In the example shown in FIG. 16 the water pipes 6 and 8 are copper pipes 11 comprising an auxiliary electrode 12, as in the magnified detail of 10, which is realized as a copper wire 12 running coaxial to the respective pipe 11 and being held at a distance to the pipe by spacers 13. As control unit 14 is provided by which a time-dependently changing voltage can be applied between the auxiliary electrode and the copper wire.

Figure 17A:
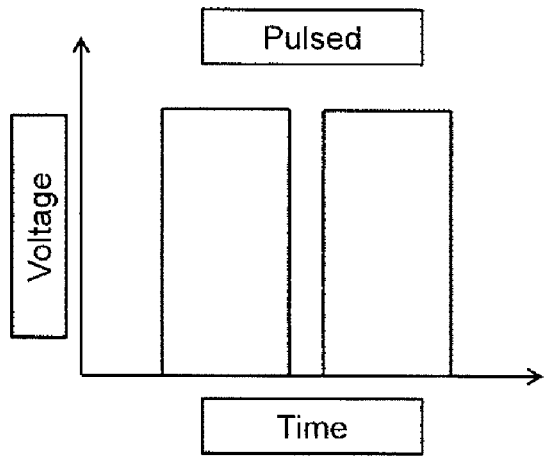

FIG. 17A to FIG. 17D show different voltage forms which can be employed in the present invention as the voltage changing time dependently. FIG. 17A shows a unipolar pulsed voltage in which voltage of one polarity is repeatedly increased to a certain value where it remains for a certain time before it drops back to zero. In this voltage form switching on shall be considered the first increase of voltage and switching off shall be considered the last drop to zero while the voltage changes in between constitute the time-dependently changing voltage. The increase and drop preferably happen in a short or essentially no time.

Figure 17B:
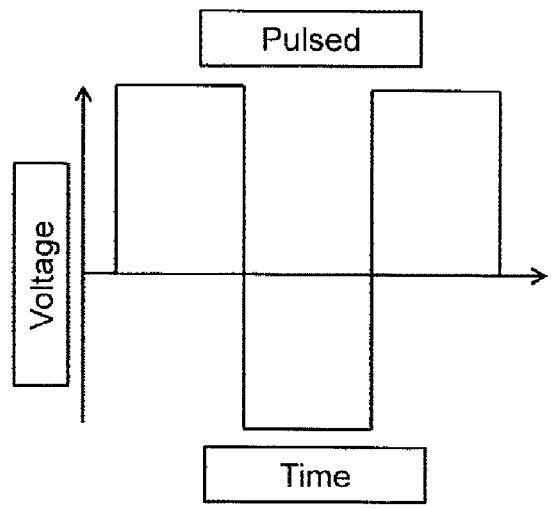

FIG. 17B shows a bipolar pulsed voltage where after switching on the voltage repeatedly assumes a constant first value for a certain time having one polarity and then assumes a constant second value having opposite polarity for a certain time, wherein the times for assuming the first and second value may be equal. The changing may happen in a very short or essentially no time.

Figure 17C:
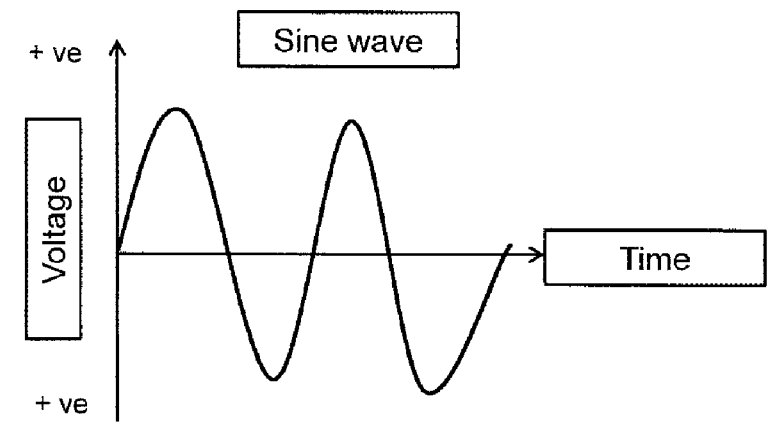

FIG. 17C shows a sine voltage where the voltage changes in time according to a sine function.

Figure 17D:
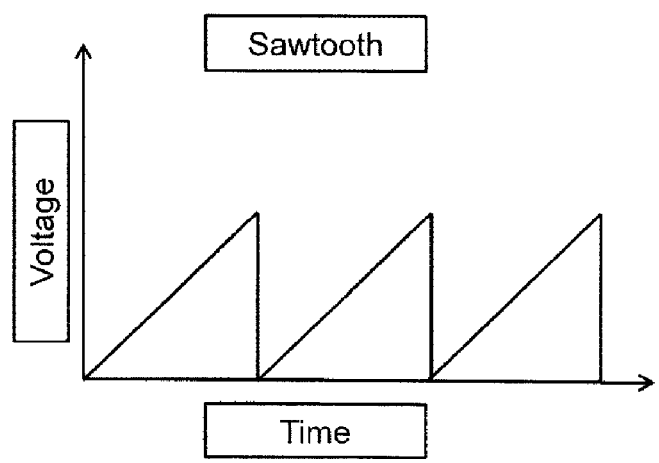

FIG. 17D shows a saw tooth voltage, where the voltage after being switched on repeatedly increases to a certain value at a constant change rate and when reaching the certain value drops to zero in a very short or practically no time. When reaching zero the increase at the constant rate starts again. This voltage form has proven particularly suitable for carrying out the present invention.

What is claimed is:

1. A method for improved corrosion inhibition of metal in a system, in which system the metal is in contact with water and a corrosion inhibitor, comprising applying a voltage between the metal and an auxiliary electrode, wherein the voltage changes time-dependently after being switched on and before being switched off within a passivation region of the metal in said corrosion inhibitor, the passivation region being formed by a region of voltage in which the corrosion inhibitor effects an inhibition of corrosion of the metal.

2. The method according to claim 1, wherein the voltage is always smaller than a pitting voltage of the metal in the corrosion inhibitor solution, the pitting voltage being the lowest voltage at which pitting occurs in the metal in the corrosion inhibitor solution.

3. The method according to claim 1, wherein the passivation region is a region in which stable pitting corrosion of the metal does not occur when the metal is in contact with said corrosion inhibitor solution.

4. The method according to claim 1,
wherein the voltage is a swept voltage or a pulsed voltage or a voltage having a waveform, preferably a saw tooth form.

5. The method according to claim 1,
wherein the voltage changes at a rate of greater or equal 0.5 mV/s, preferably greater or equal 0.7 mV/s and/or lower or equal 2 mV/s, preferably lower or equal 1.5 mV/s, preferably of 1 mV/s.

6. The method according to claim 1,
wherein the voltage has a modulated frequency with alternated negative and positive whole cycles or positive cycles or negative cycles.

7. The method according to claim 1,
wherein the maximum of the voltage applied between the metal and the auxiliary electrode is 0.4 V, preferably 0.3 V, preferably 0.25 V, preferably 0.15 V, preferably 0.1 V, preferably 0.08V.

8. The method according to claim 1,
wherein the minimum of the voltage applied between the metal and the auxiliary electrode is −0.8 V, preferably −0.4 V, preferably −0.2 V, preferably −0.15V.

9. The method according to claim 1,
wherein the voltage applied between the metal and the auxiliary electrode sweeps between a minimum voltage and a maximum voltage at least 2 times, preferably at least 4 times, preferably at least 6 times.

10. The method according to claim 1,
wherein in a first step the metal is brought in contact with a corrosion inhibitor solution, and the voltage applied in the applying is applied in a second step after the first step, where, in the second step, the metal is no longer in contact with the corrosion inhibitor solution.

11. The method according to claim 1,
wherein the corrosion inhibitor is provided in the water to produce a corrosion inhibitor solution, and while the metal is in contact with the corrosion inhibitor, the voltage, preferably a swept voltage, is applied which preferably varies within the region of voltage to establish the passivation region in the metal immersed in the corrosion inhibitor solution, and the swept voltage is preferably between −0.8 V and +0.4 V.

12. The method according to claim 1,
wherein the corrosion inhibitor comprising Benzotriazole, (BTA), or a derivative of Benzotriazole, or a mixture of Benzotriazole and Triethanolamine (TEA), or a mixture of a derivative of Benzotriazole and Triethanolamine, is supplied in a corrosion inhibitor solution,
wherein the corrosion inhibitor solution does not contain a solvent except for water.

13. The method of claim 12 wherein a passivation solution is used to form the passivation region and the passivation solution consists of Benzotriazole (BTA), or a derivative of Benzotriazole, or a mixture of Benzotriazole, and Triethanolamine (TEA), or a mixture of a derivative of Benzotriazole and Triethanolamine.

14. The method according to claim 1,
wherein the metal is metal in a metal piping system or a closed loop heating system, and the water is tap water.

15. The method according to claim 1,
wherein the metal is metal in a piping system comprising at least one pipe, and wherein the auxiliary electrode is at least partially formed as a wire running through the at least one pipe.

16. The method according to claim 15,
wherein the auxiliary electrode at least partially formed as a wire is held at a distance to an inner wall of the at least one pipe by at least one or a plurality of spacers, and
wherein the at least one or plurality of spacers is a polytetrafluoroethylene sphere having a diameter equal to or smaller than an inner diameter of the at least one pipe through which the wire is running.

17. The method according to claim 1,
wherein the auxiliary electrode consists of copper and/or titanium.

18. The method according to claim 1,
wherein a voltage due to corrosion between the metal and the auxiliary electrode is measured and the voltage applied between the metal and the auxiliary electrode is switched on when said voltage due to corrosion is greater than a predefined threshold.

19. The method according to claim 1,
wherein the method is employed to remedy existing corrosion.

* * * * *